US011304379B2

(12) United States Patent
Brinkerhoff et al.

(10) Patent No.: US 11,304,379 B2
(45) Date of Patent: Apr. 19, 2022

(54) PLANT GROWING ASSEMBLY

(71) Applicant: SAO LABS, LLC, Livermore, CA (US)

(72) Inventors: Brian Brandes Brinkerhoff, Burlingame, CA (US); Todd Alan Smith, Woodside, CA (US); Deepak Goklani, Livermore, CA (US)

(73) Assignee: SAO LABS' LLC, Livermore (CA)

(*) Notice: Subject to any disclaimer, the term of this patent is extended or adjusted under 35 U.S.C. 154(b) by 171 days.

(21) Appl. No.: 16/790,987

(22) Filed: Feb. 14, 2020

(65) Prior Publication Data
US 2020/0260656 A1    Aug. 20, 2020

Related U.S. Application Data

(60) Provisional application No. 62/806,165, filed on Feb. 15, 2019.

(51) Int. Cl.
*A01G 9/029*    (2018.01)

(52) U.S. Cl.
CPC .................................. *A01G 9/029* (2018.02)

(58) Field of Classification Search
CPC .... A01G 9/028; A01G 9/0293; A01G 9/0295; A01G 9/02; A01G 27/00; A01G 27/006; A01G 27/005; A01G 27/02; A01G 27/04; A01G 27/06; B65D 25/14; B65D 25/16
See application file for complete search history.

(56) References Cited

U.S. PATENT DOCUMENTS

| | | | |
|---|---|---|---|
| 1,624,407 A * | 4/1927 | Hamilton | A47G 7/00 47/41.11 |
| 3,315,410 A * | 4/1967 | French | A01G 9/021 47/65.7 |
| 5,775,205 A * | 7/1998 | Melton | B29C 51/32 99/322 |
| 5,913,964 A * | 6/1999 | Melton | B65D 47/0847 99/322 |
| 6,446,827 B1 * | 9/2002 | Akins | B44D 3/12 220/570 |
| 9,027,277 B2 * | 5/2015 | Castleberry | B65D 85/505 47/41.01 |
| D801,212 S * | 10/2017 | Livingston | D11/152 |
| 10,874,063 B2 * | 12/2020 | Littlewood | A01G 27/02 |
| 11,102,941 B2 * | 8/2021 | Bacher | A01G 9/0293 |
| 2008/0052993 A1 * | 3/2008 | Nagoya | A01G 27/02 47/79 |
| 2009/0151248 A1 * | 6/2009 | Bissonnette | A01G 31/02 47/59 S |
| 2014/0196367 A1 * | 7/2014 | Hasagawa | A01G 27/04 47/62 R |

FOREIGN PATENT DOCUMENTS

| | | | | |
|---|---|---|---|---|
| CA | 2821917 A1 | * | 12/2013 | A01G 27/04 |
| WO | WO-2018185117 A1 | * | 10/2018 | A01G 31/02 |

* cited by examiner

*Primary Examiner* — Kristen C Hayes
(74) *Attorney, Agent, or Firm* — Gottlieb, Rackman & Reisman, P.C.

(57) ABSTRACT

A plant growing assembly comprises a pod with an upper surface and a rigid open-mouthed vessel, these components being matable. The pod is of one piece and carries a growing medium and seeds.

18 Claims, 10 Drawing Sheets

PLANT GROWING ASSEMBLY

CROSS REFERENCE TO RELATED APPLICATIONS

This application claims priority to U.S. Provisional Patent Application Ser. No. 62/806,165 filed Feb. 15, 2019, the entire contents of which is expressly incorporated by reference.

FIELD OF THE INVENTION

This invention relates to a plant growing assembly.

BACKGROUND

Herb gardening has traditionally required outdoor space and soil. Not everyone that wants to grow herbs has access to an appropriate outdoor environment. Various products are available for growing herbs indoors. However, such prior art products are not designed for growers with an ethos based in conservation, composting, green, organic and sustainable materials sourcing. The existing products use non-sustainable materials in their construction, are not organic in nature, and are not designed to be composted, or allow the plant to be easily re-planted or transplanted.

Prior art products use complicated hydroponic systems are also generally shipped as multi-part kits that require assembly and construction and generally require some level of skill, experience or knowledge of gardening. They can also require introduction of nutrients and soil into the metal or plastic grow medium. Existing art products are messy and dirtier due to the soil and loose nutrients, require garden experience and skills, and can have a very narrow margin of error to successfully produce plants.

Some prior art products either hang or are loosely fitted into a container, such as a glass jar, and are thus susceptible to root disturbance and plant growth disruption. They do not provide a stable and secure environment in the glass jar as they hang on the lip.

SUMMARY

The present invention provides the ability to grow herbs in a small footprint, indoor environment without the need for soil or a small amount of soil. This product is created from a sustainably sourced organic material that allows for year-round, indoor gardening.

A growth container is formed of the grow medium and configured to be used with a conventional wide-mouth jar and is stabilized by a friction fit between the container and the pod. Essentially no assembly is required. The assembly requires minimal parts and does not require introduction of large amounts of soil or additional nutrients by the user. The product can easily be used by a beginning gardener and gives a high success rate in producing plants.

The products is designed to sit on window sills or other small household or office areas and provides an organic and 'green' solution for contemporary herb gardening that can be composted post-harvest or re-planted for additional harvests.

DESCRIPTION OF THE DRAWINGS

The following is a description of the drawings of aspects of the present invention wherein

FIG. 1 shows the plant pod and the glass jar of the invention, prior to these units being assembled;

FIG. 2 is a cross-section of the plant pod empty, taken along the line 2-2 of FIG. 1;

FIG. 3 is a figure similar to FIG. 2, with a growing medium and seeds in the plant pod;

FIG. 4 is an exterior view of the plant pod and glass jar in assembled condition;

FIG. 5 is a cross-section of the assembled unit, similar to FIG. 4, and showing plants rising from their roots in the pod;

FIG. 6 shows in the second embodiment, the plant pod and the glass jar of the invention, prior to these units being assembled;

FIG. 7 is a cross-section of the plant pod empty, taken along the line 7-7 of FIG. 6;

FIG. 8 is a figure similar to FIG. 7, with a growing medium and seeds in the plant pod;

FIG. 9 is an exterior view of the plant pod and glass jar in assembled condition; and FIG. 10 is a cross-section of the assembled unit, taken along the line 10-10 of FIG. and showing plants rising from their roots in the pod.

DETAILED DESCRIPTION

Figure 1:
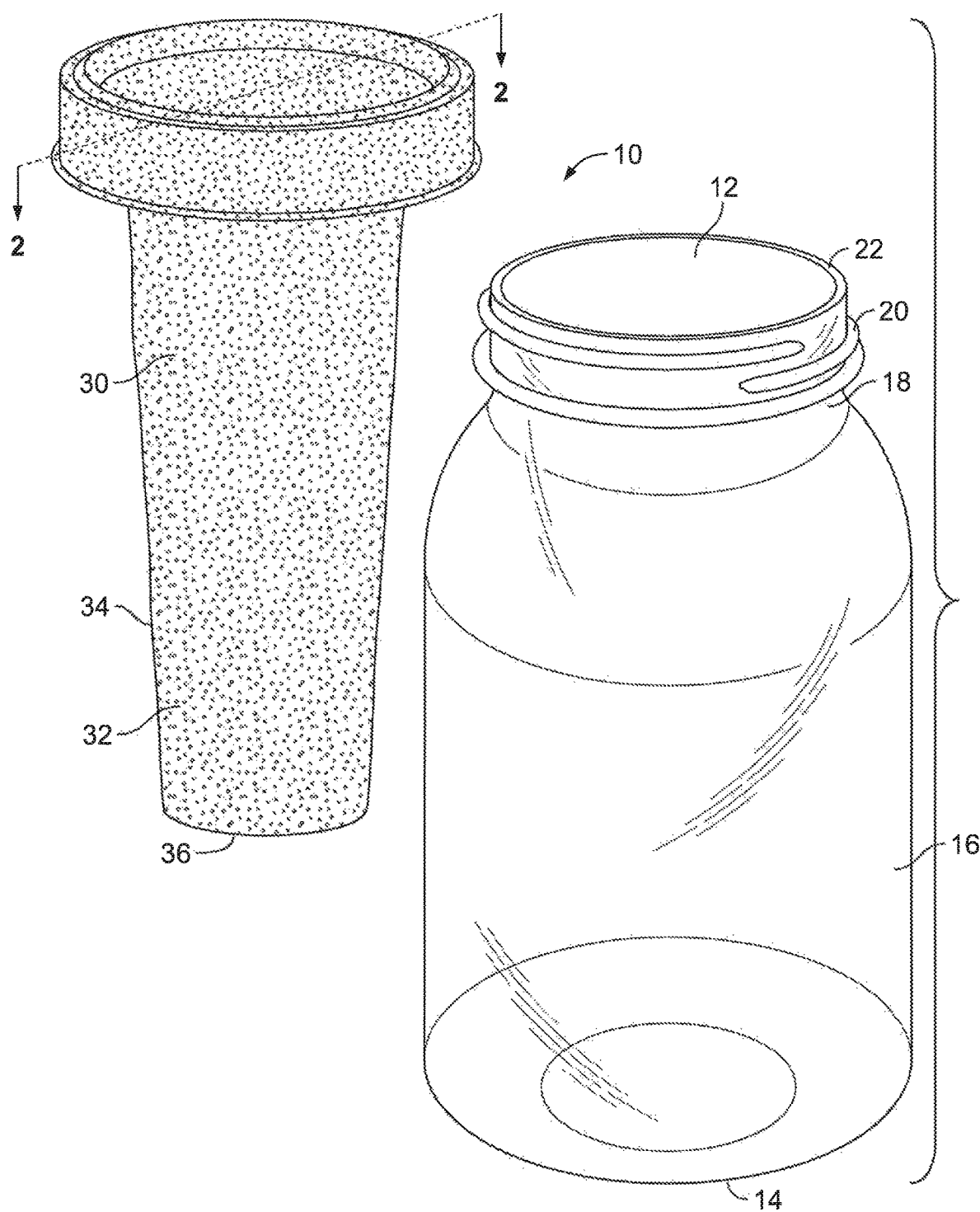
FIGS. 1-5 show a first embodiment and FIGS. 6-10 show a second embodiment, and more specifically where.

The two components of the plant growing assembly 10 in the first embodiment are shown separated in FIG. 1 and comprise a glass jar 12 and a plant pod 30. The jar can be of the Mason jar type and includes a bottom wall 14, a cylindrical wall 16 and a narrow neck 18. At the top of the neck is a male screw thread 20, which is topped by a flat upper rim 22. The jar 12 is shown empty in FIG. 1 and shown filled in FIG. 5. While a glass jar is shown in all of the drawings, the jar may be any wide-mouthed substantially rigid container made of materials other than glass, and may be transparent or opaque. In an embodiment, the container is transparent.

The plant pod 30 includes a conical cylinder 32, which is made up of a pod wall 34 and a bottom wall 36. As best seen in the cross sections of FIGS. 2 and 3, the pod 30 at its top end is open and has a pod cap 38 which is made up of an overhanging wall 40 which has an internal grip which comprises the screw thread 42. The pod thread 42 is matable and binds in a friction fit with the thread 20 of the jar 12. The plant pod can be formed of a single piece of material.

Figure 3:
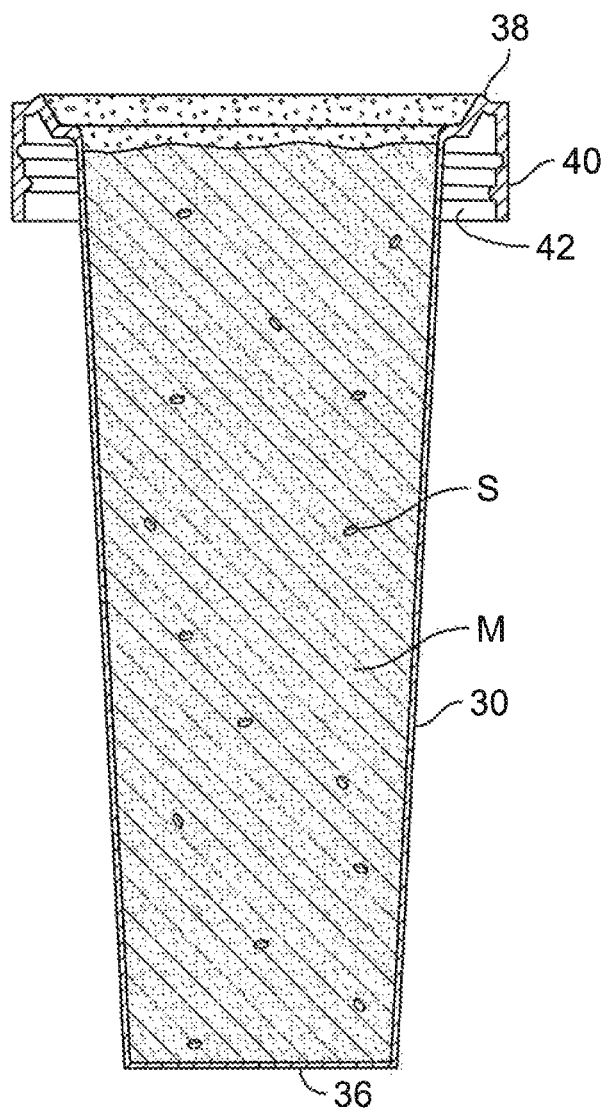

As seen in FIG. 3, the pod 30 is filled with a growing medium M. Preferably, the growing medium is the same as the material from which the pod is formed, but in shredded form. The medium in both disclosed embodiments may also be other light-weight organic materials such as coconut coir, denim and rock wool. Seeds S of plants such as basil, cilantro, mint, catnip, wheatgrass, oregano, flowering bulbs, sage, begonias, violets, and the like are placed in the medium.

Figure 2:
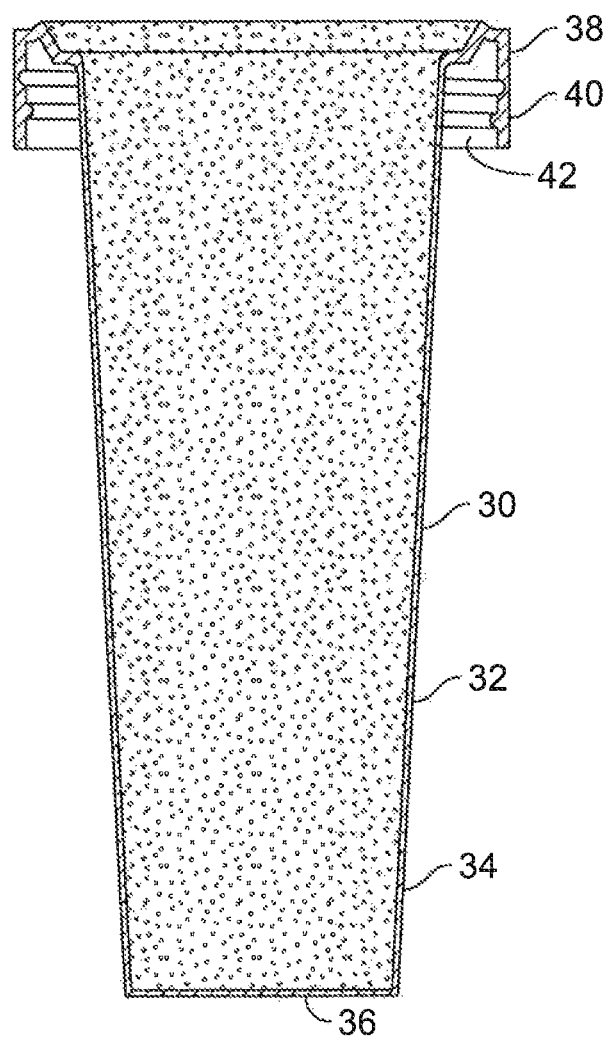
Figure 4:
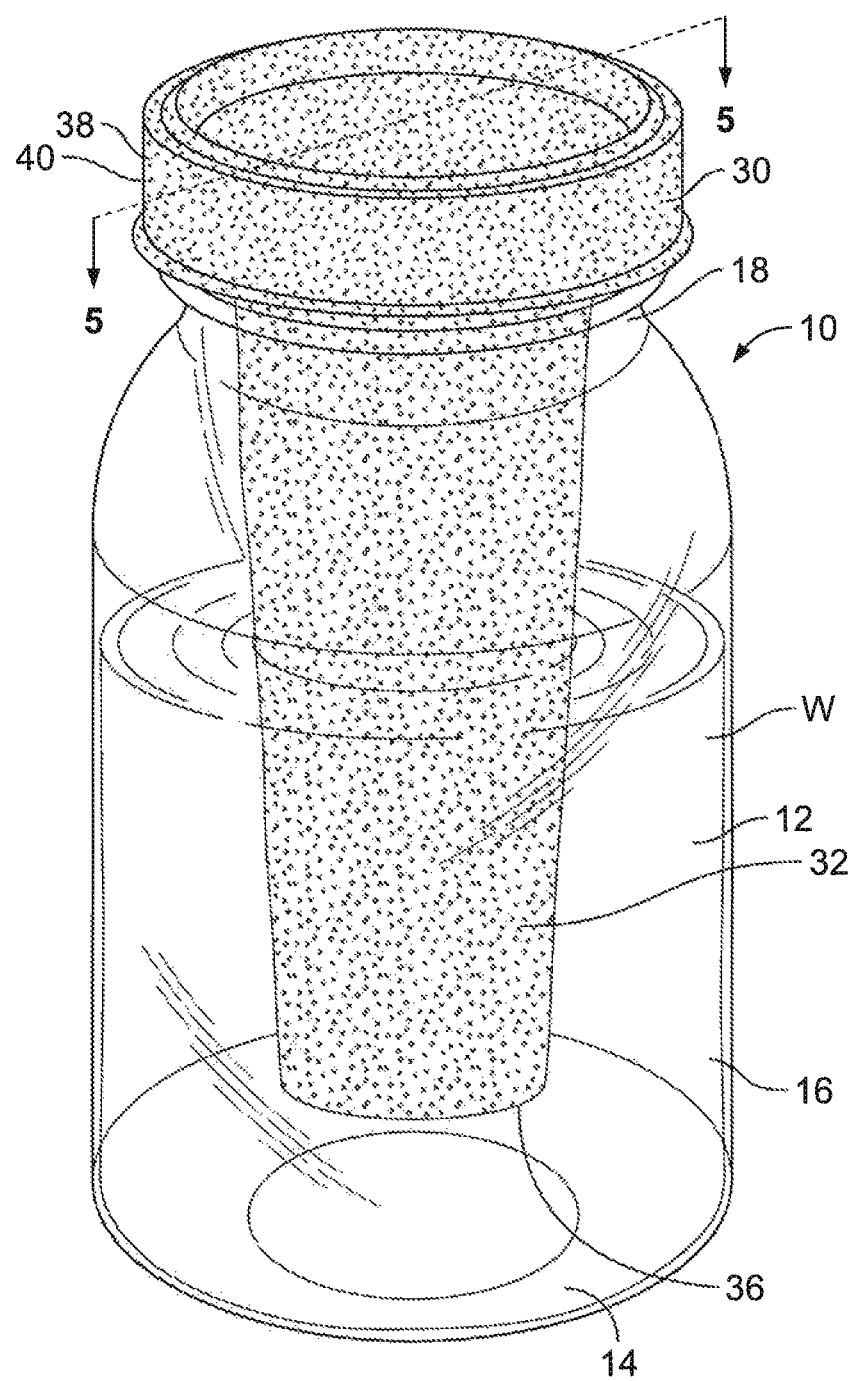

In assembly, the empty plant pod 30, as seen in FIG. 2, is filled with the growing medium M within which are placed the seeds S, to form the filled pod, as seen, e.g., in FIG. 3. Water W is placed into the jar 12 as shown in FIG. 4. The pod 30 is then placed into the jar 12 so that the pod cap wall 40 sits on jar rim 22 and then the pod is rotated so that its thread 42 in a friction grip matingly engages and couples with and tightens onto the thread 20 of the jar. It will be apparent that this is a quick and easy, stable yet snug connection. In this configuration, the overhanging wall 40 of the pod is thus firmly and securely engaged to the upper end of the neck 18 of the jar and its cap 40 sits on and engages the upper rim 22 of the jar. The bottom wall 36 of the pod is located above the bottom wall 14 of the jar.

Figure 5:
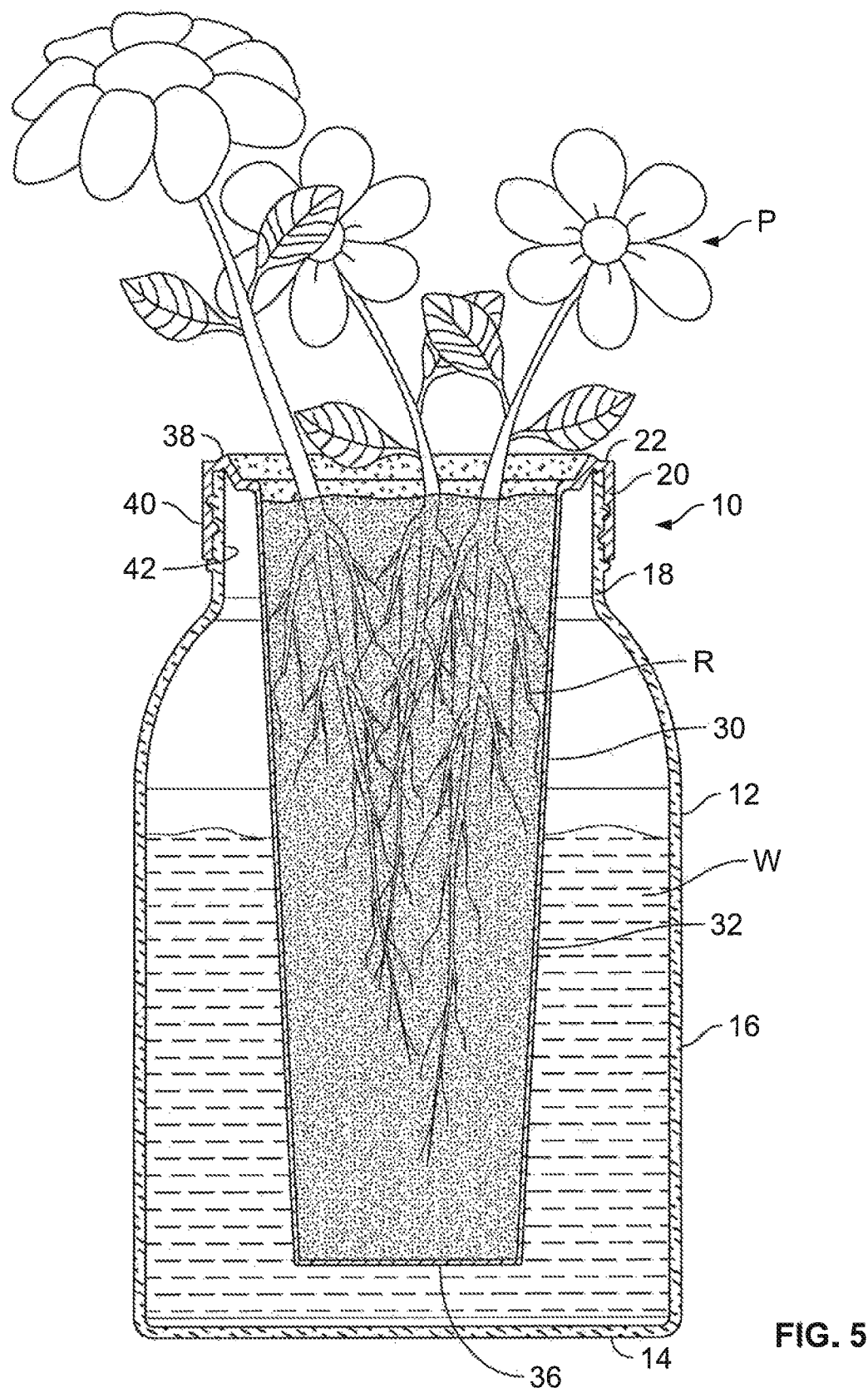
Figure 6:
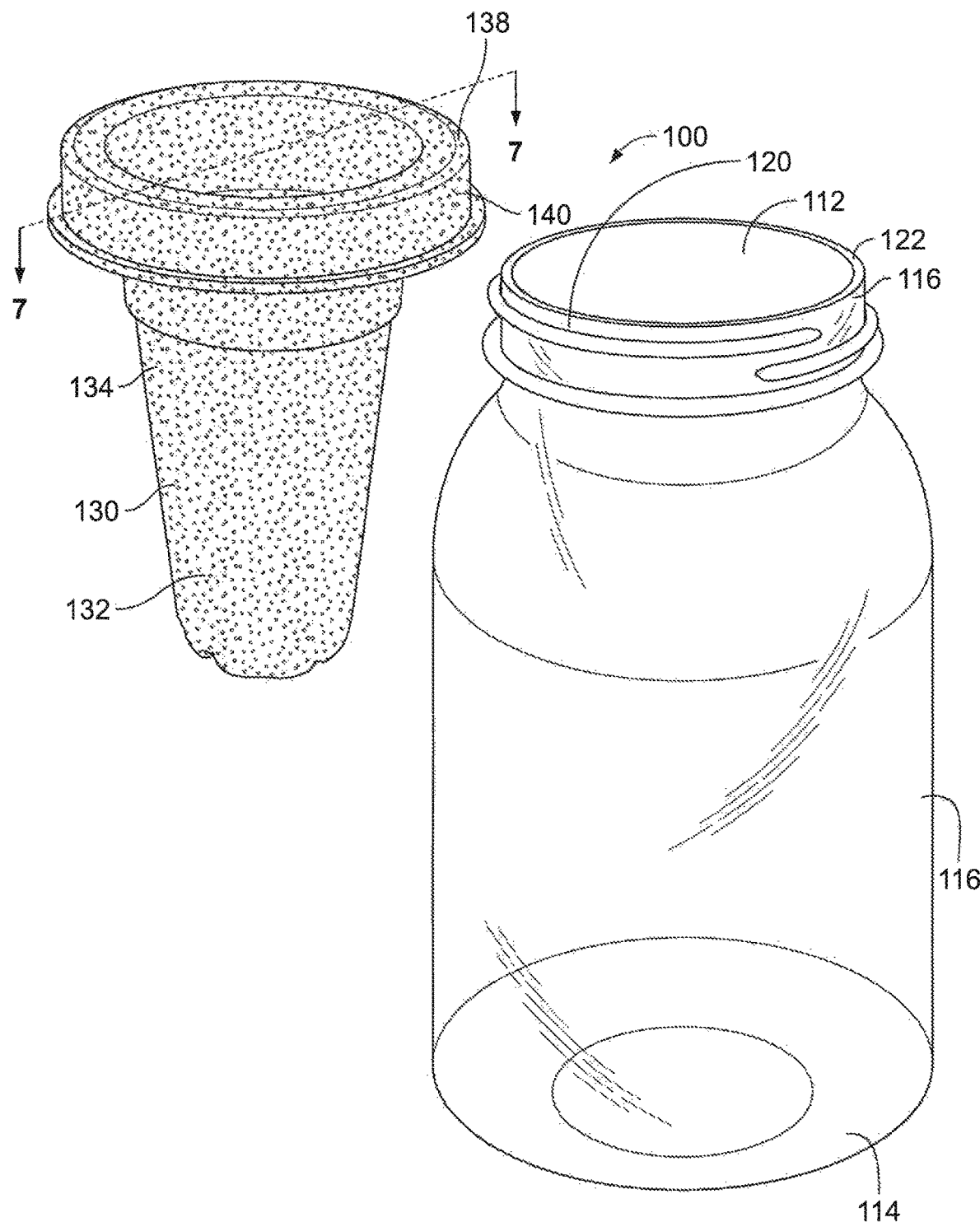

As best seen in FIG. 5, roots R are formed from the seeds S and sprout through the central openings of the pod and jar to form plants P of various types. When the plants have finished their useful life, the pod 30 may be removed by gently twisting and lifting upwardly. Once dried, the pod can be re-planted in a garden or box after initially sprouting in the jar and it ultimately will decompose and provide nutrients to the plant. If the user chooses not to re-plant the pod in a non-jar environment after initial sprouting and harvesting, the pod can be safely and responsibly discarded, such as into a compost bin or trash receptacle.

With respect to the second embodiment of the invention, shown in FIGS. 6-10, the two components of the growing assembly 100 comprise a glass jar 112 and a plant pod 130. The jar can be of the Mason jar type or may be any wide-mouthed substantially rigid transparent or non-transparent container and includes a bottom wall 114, a cylindrical wall 116 and a narrow neck 118. The top of the neck carries a male screw thread 120, topped by a flat upper rim 122. See FIGS. 6 and 10.

Figure 7:
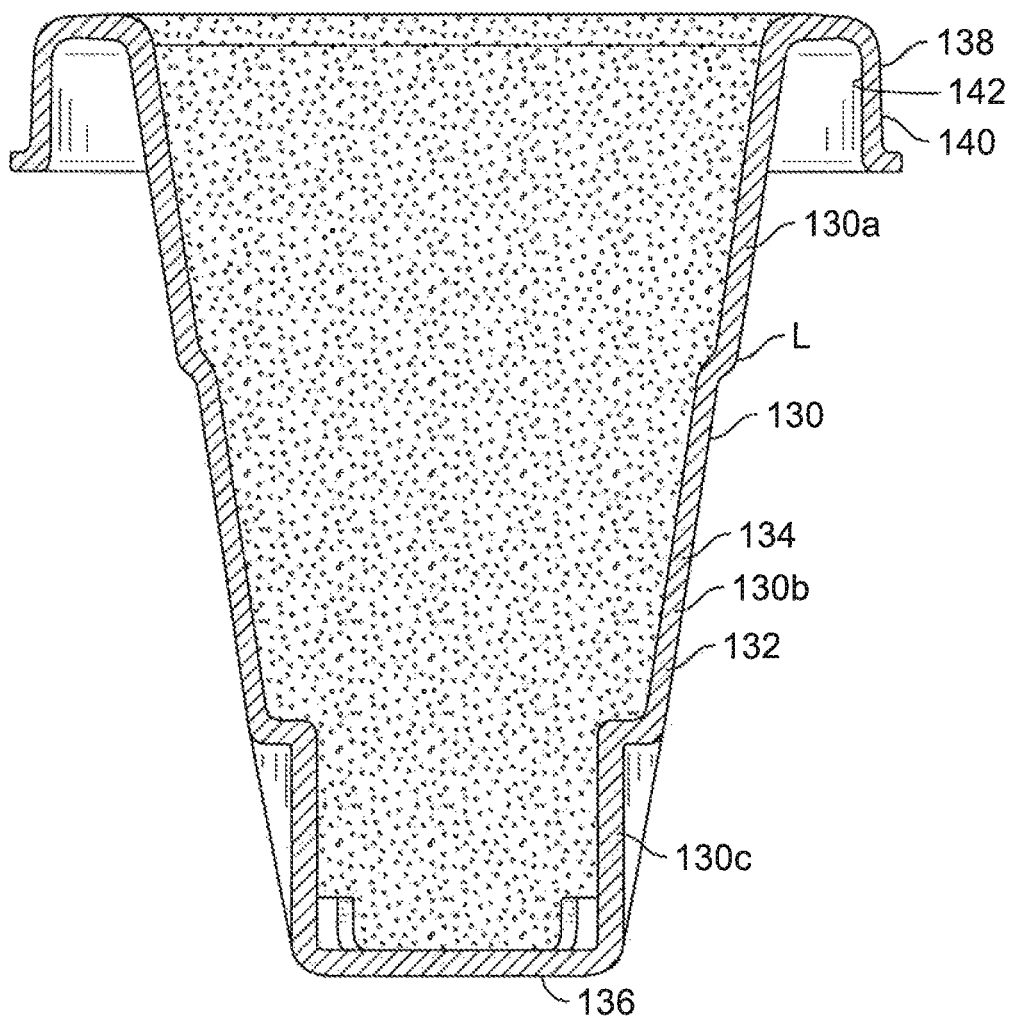
Figure 8:
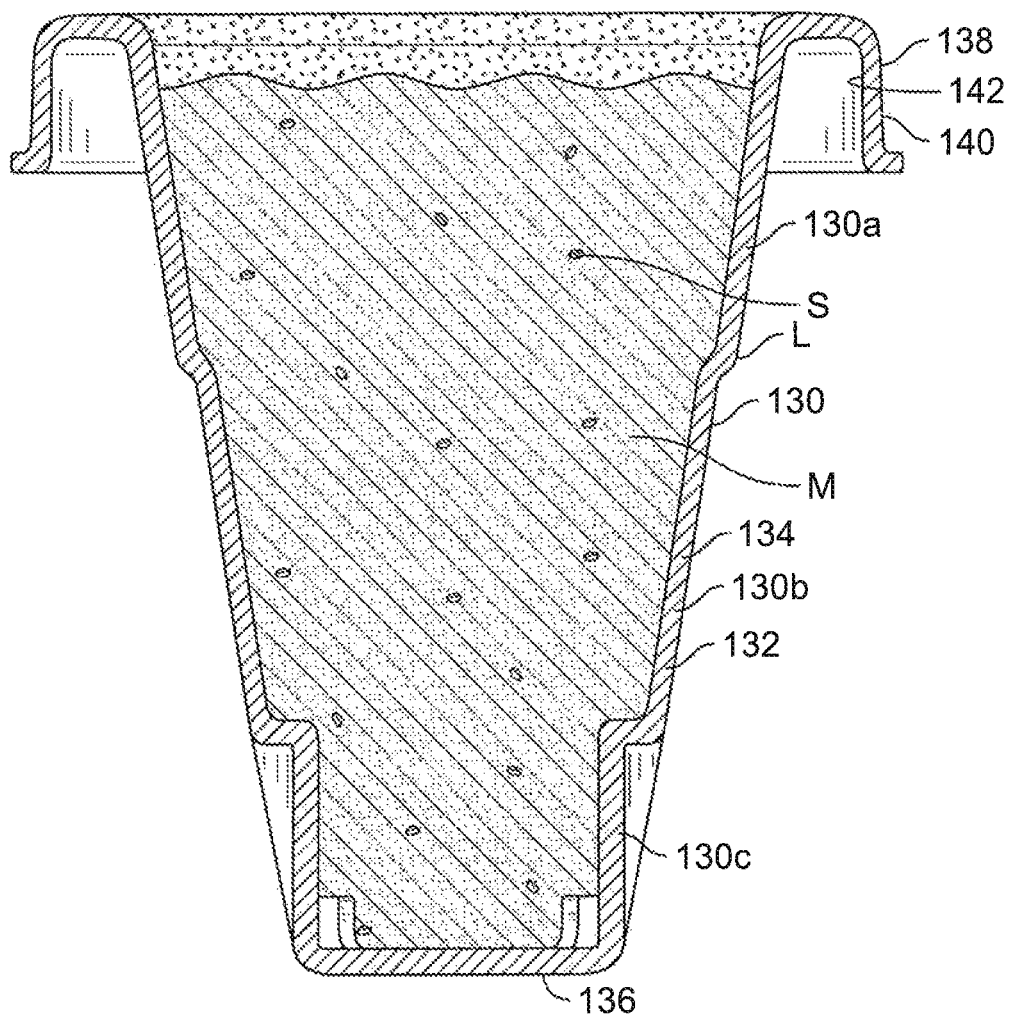

The plant pod 130 includes a conical cylinder 132, which is made up of a pod wall 134 and a bottom wall 136. As best seen in FIGS. 7 and 8, the pod 130 is open at its top end and has a pod cap 138. The cap has a downwardly facing overhanging wall 140 with an internal flat mating surface 142. The pod can be formed of a single piece of material. The pod may be stepped, with an upper section 130a, a mid-section 130b and a lower section 130c, these from the top to the bottom having reduced diameters.

Figure 10:
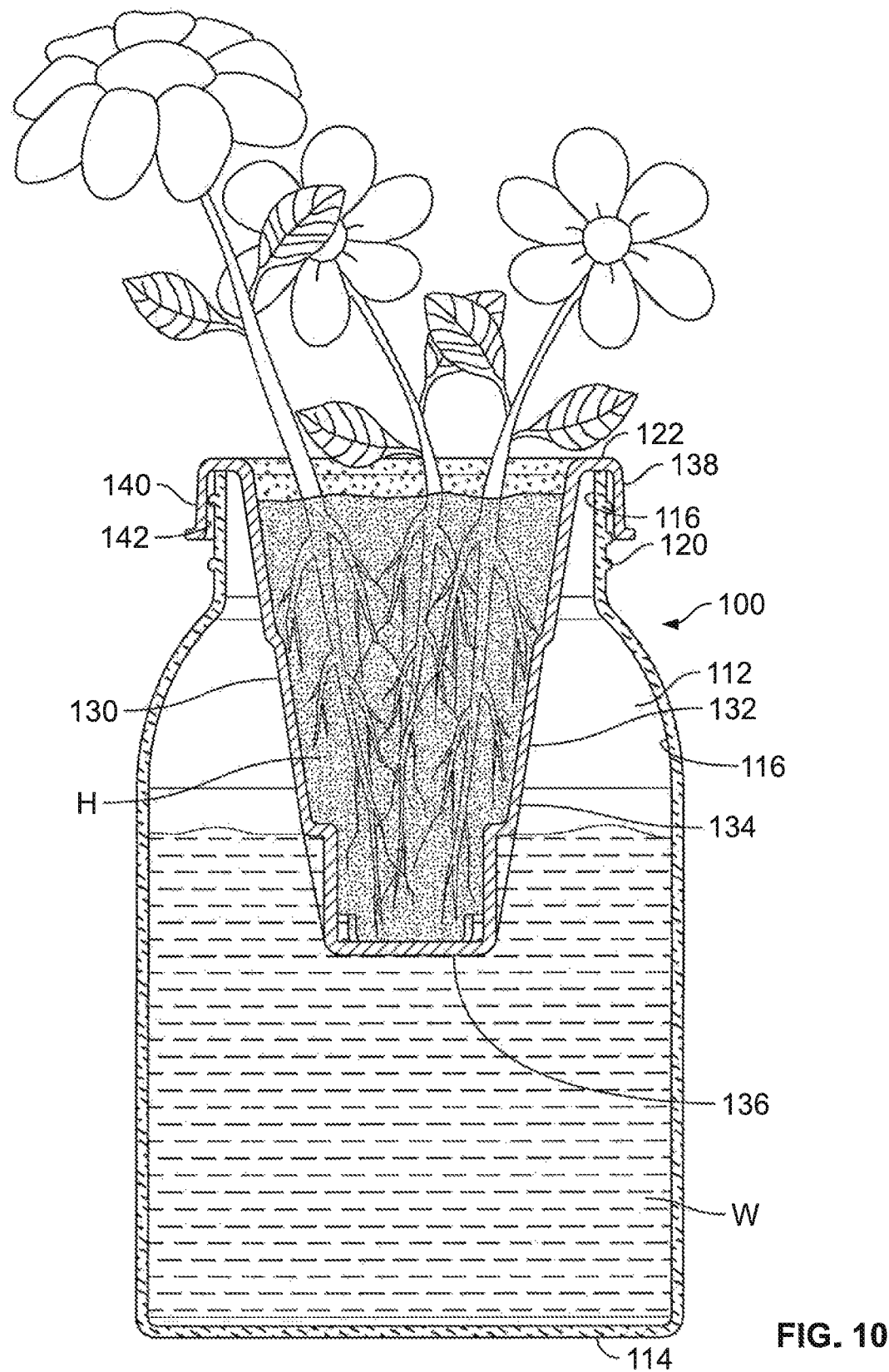

As seen in FIGS. 8 and 10, the pod is filled with a growing medium M. Preferably, the growing medium is the same as the material from which the pod is formed, but in shredded form. Seeds S of plants such as basil, cilantro, mint, catnip, wheatgrass, oregano, flowering bulbs, sage, begonias, violets, and the like are placed in the medium M.

Figure 9:
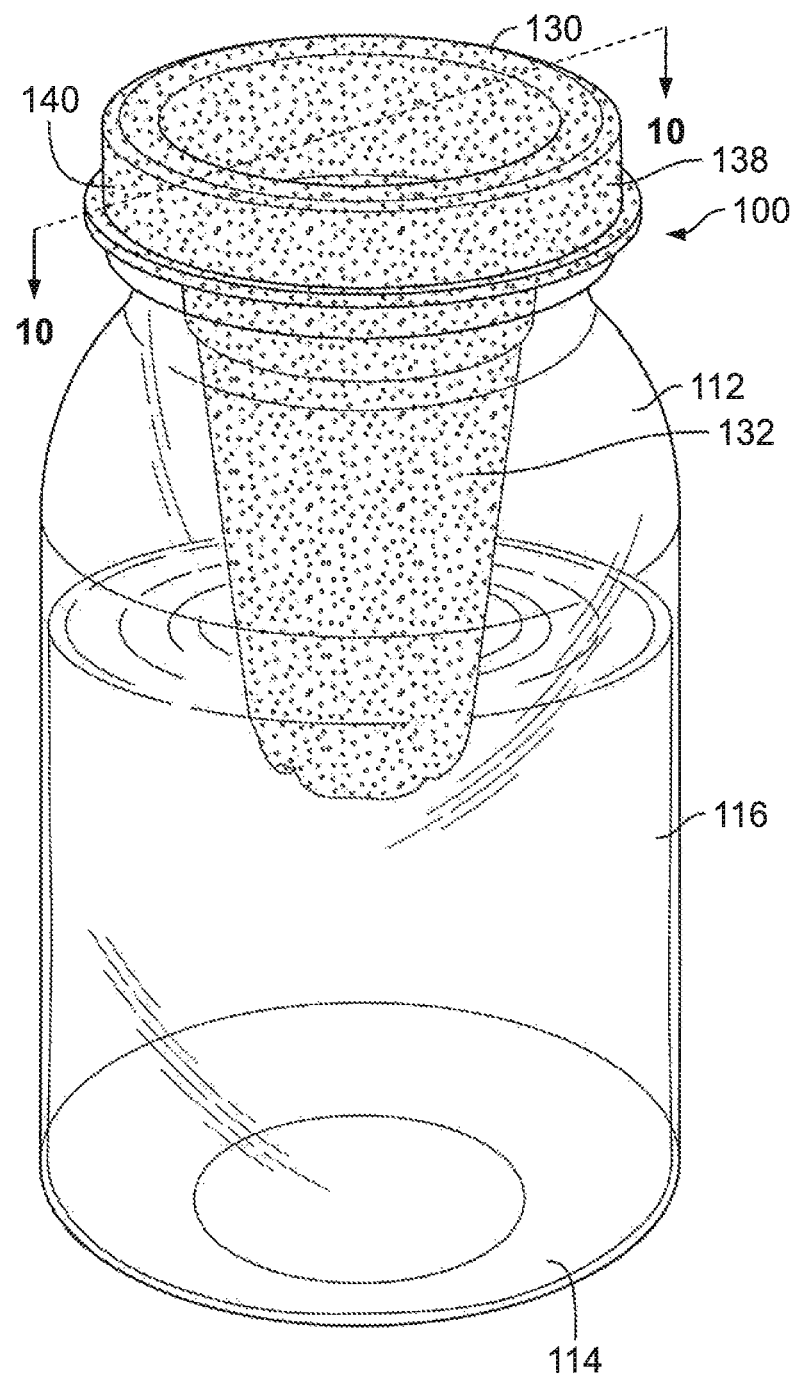

In assembly, the empty plant pod 130, as seen in FIG. 9, is filled with the growing medium M within which are placed the seeds S, to form the filled pod, as seen in FIG. 10. Water W is desirably placed into the jar 112 up to the point indicated by the fill line L of the pod, see FIGS. 7 and 8. The pod 130 is then placed into the jar 112 and urged downwardly so that the wall 140 snugly and stably sits on the jar rim 122 and so that its mating surface 142 frictionally and matingly engages and couples with the thread 120 of jar in a friction grip to form a stable tight, snug binding, bridging connection. It will be apparent that this is a quick and easy connection. In this configuration, the overhanging wall 140 of the pod is firmly and securely engaged to the upper end of the neck 118 of the jar and its cap 140 snugly sits on and engages the upper rim 122 of the jar. It is within the scope of the present invention that neither the pod nor the jar carry threads at their upper portions, but the pod is secured to its related jar by a friction fit, stabilized by the overhanging wall of the pod sitting on the neck of the jar.

As best seen in FIG. 10, roots R are formed from the seeds S and sprout through the central opening of the pod and also penetrate the organic walls of pod form plants P of various types. When the plant seedlings have sufficiently matured and the pod has dried, the pod 30 may transplanted into a larger container either indoors or outdoors by twisting gently upwardly and removed. Ultimately the pod will decompose and provide nutrients and be part of the plant itself, if the pod is re-planted after initially sprouting in the jar. If the user chooses not to re-plant the pod in a non-jar environment after initial sprouting and harvesting, the pod can be placed into an outdoor compost pile, compost bin or trash receptacle.

The pod in both embodiments is desirably formed of a natural, biodegradable, renewable, sustainable and compostable material, in a pressed form. In a particular embodiment, the pod is formed as a coconut husk/coir product or other materials as previously noted. The permeability of the pod is enough to allow water to efficiently wick to the seeds and root structure while providing both adequate water retention as the water level in the jar recedes as well as drainage. The choice of material used to manufacture the pod should advantageously be rot resistant. In a particular embodiment, the pod is formed from molded pulp, and made from 100% recycled newspaper.

Unlike a product that might be made of mesh or netting, the disclosed pod is rigid enough to provide the root structure with sufficient support while providing adequate permeability to facilitate wicking and water retention.

The disclosed structure provides an ideal and secure grow environment that is missing from the prior art products. The pod secures firmly engages the threads on the glass jar thus eliminating the chance of the pod falling out of the jar if it is accidentally spilled or tipped. Such pod movement stability minimizes rootball disruption that can hamper growth.

The disclosed pod sizing and length is designed to extend deep enough into the jar to facilitate water wicking and the pod walls tapered to facilitate easy insertion and removal from the jar and the adding of additional water.

The choice of coconut coir, molded pulp or a similar organic, sustainable materials as disclosed herein is because the pod needs to retain water but minimize pod and/or root rot.

Various aspects, embodiments, and examples of the invention have been disclosed and described herein. Modifications, additions and alterations may be made by one skilled in the art without departing from the spirit and scope of the invention as defined in the appended claims.

There is claimed:

1. A plant-growing assembly comprising:
a wide-mouthed jar having a containing wall and a neck, the neck having an upper rim;
a plant pod formed in a single piece and made of a natural, biodegradable, and water permeable material, the pod having a conical shape with a substantially solid surface throughout and being open at its upper end and capable of carrying and being filled with a growing medium with seeds, the pod at its upper end having a cap and an overhanging wall with an internal matable surface, the upper rim of the jar being matable with the said surface of the pod;
whereby, when the pod is assembled with the jar, the pod cap sits on the jar rim and the surface of the pod frictionally engages the jar.

2. The plant-growing assembly of claim 1, wherein the matable surface on the pod is a thread.

3. The plant-growing assembly of claim 1, wherein the pod is conical.

4. The plant-growing assembly of claim 1, wherein seeds and a growing medium are located in the pod.

5. The plant-growing assembly of claim 1, wherein the pod is conical and the jar is cylindrical.

6. The plant-growing assembly as set forth in claim 5 wherein the jar is glass.

7. The plant-growing assembly as set forth in claim 1 wherein the pod is molded pulp.

8. The plant-growing assembly as set forth in claim 1 wherein the pod carries a thread and the jar carries a thread, said threads mating upon assembly.

9. The plant-growing assembly as set forth in claim 1, wherein the pod carries a thread and the jar carries a thread, said threads mating upon assembly.

10. A plant-growing assembly comprising:
a wide-mouthed jar having a containing wall and a neck, the neck having an upper rim; a plant pod formed in a single piece and made of a solid material that is natural and biodegradable, the pod having a conical shape open at its upper end;
the pod filled with a growing medium comprising a shredded form of the solid material and with seeds;
the pod at its upper end having a cap and an overhanging wall;
whereby, when the pod is assembled with the jar, the pod cap sits on the jar rim.

11. A plant-growing assembly as set forth in claim 10 wherein the pod is stepped and has a fill line to denote water level.

12. The plant-growing assembly of claim 10, the cap and overhanging wall having an internal matable surface, the upper rim of the jar being matable with the surface.

13. The plant-growing assembly of claim 10, wherein the matable surface on the pod is a thread.

14. The plant-growing assembly as set forth in claim 10 wherein the material is molded pulp.

15. A plant growing method comprising the steps of:
providing a wide-mouthed jar having a containing wall and a neck, the neck having an upper rim;
providing a plant pod formed in a single piece and made of a solid material that is natural and biodegradable, the pod having a conical shape open at its upper end and being filled with a growing medium comprising a shredded form of the solid material and having seeds distributed therein, the pod at its upper end having a cap and an overhanging wall;
adding water to the jar; and
inserting the pod in the jar so that the pod cap sits on the jar rim;
wherein after the steps of adding water to the jar and inserting the pod a portion of the pod extends into the water.

16. The method of claim 15, wherein the pod carries a thread and the jar carries a thread, the method further comprising the step of rotating the pod relative to the jar after the inserting step so that the thread on the jar and the thread on the pod matingly engage.

17. The method of claim 15, wherein the pod is stepped and has a fill line formed thereon, the step of adding water to the jar comprising adding an amount of water to the jar so the water leval is at the fill line when the pod is inserted in the jar.

18. The method of claim 15, further comprising the step of removing the pod from the jar after the seeds have sprouted and planting the pod in a garden area separate from the jar.

* * * * *